Oct. 31, 1967   V. I. RYZHOV-NIKONOV ETAL   3,349,609
ULTRASONIC PULSE ECHO FLAW-DETECTOR
Filed May 1, 1964

United States Patent Office 3,349,609
Patented Oct. 31, 1967

3,349,609
ULTRASONIC PULSE ECHO FLAW-DETECTOR
Vladimir Ivanovich Ryzhov-Nikonov, Valery Semenovich Grebennik, and Igor Nikolaevich Ermolov, Moscow, U.S.S.R., assignors to Tsentralny Nauchno-Issledovatelsky Institute Tekhnologii i Mashinostroenia
Filed May 1, 1964, Ser. No. 364,243
5 Claims. (Cl. 73—67.9)

The present invention relates to ultrasonic pulse echo flaw-detectors with an ultrasonic probe with angled transducer for detecting flaws and determining their location and equivalent dimensions in specified metallic profiles, such as, for instance, metal weld seams. (The probe emits a beam inclined to the work surface.).

The term "equivalent dimensions of the flaw" designates the diameter of a flat disk reflector, positioned perpendicularly to the ultrasonic beam, with the signal reflected by said reflector equal to the signal reflected by the flaw.

It has been a common practice to employ ultrasonic echo flaw-detectors, wherein the attenuation of the ultrasonic beam is compensated, depending on the thickness of the controlled area, by an arrangement controlling the amplifier gain of signals, reflected from the flaw, and wherein for the convenient visual observation of signals, reflected from the area being tested, in the cathode-ray indicator screen, an arrangement is used to control the sweep delay time of the electron-ray indicator beam.

It is a general practice in controlling said parameters of a flaw-detector with a probe, to utilize the relationship between the distance from the probe to the specified profile along the ultrasonic beam, the depth of the area being tested in the specified profile from the work surface with a probe mounted thereon, and the distance between the probe and the specified profile in the direction perpendicular to the profile plane.

The currently used ultrasonic echo flaw-detectors with a probe are disadvantageous in that the above flaw-detector parameters, viz: the amplifier gain of signals reflected from the flaw, delay time of electron-ray indicator beam sweep, are controlled manually, for instance, by means of a visual scale, reading the distance between the probe and the specified profile along the direction perpendicular to the plane of said profile. Consequently, these detector parameters cannot be rapidly and adequately controlled.

Generally speaking, flaw-detector parameters can be automatically controlled, depending on the distance between the probe and the specified workpiece profile, by arrangements comprising a displacement pickup in the form of a rod or screw gear, or consisting of a measuring unit, employing, for instance, meters, and an actuating unit made, for instance, as a follow-up system.

However, such arrangements for automatically controlling the above parameters in dependence of displacement, are complicated, bulky in construction, inconvenient for probe handling, particularly when the probe has to be moved in any direction about the work.

Another shortcoming of the known ultrasonic pulse echo flaw-detectors with a probe consists in that the amplifier gain of signals, reflected from the flaw in a wide time range, is controlled by complicated means, since said amplifier gain has to be altered throughout the whole ultrasonic emission time and, therefore, at substantial distances between the probe and the area under test, said amplifier gain should be altered within a wide range for a short period of time under a complex law.

Consequently, the disadvantages of the currently used devices are: complicated and bulky construction, and inconvenient operation.

It has been found that sweep delay time of the electron-ray indicator and amplifier gain of signals, reflected from the flaw in an ultrasonic pulse echo flaw-detector with a probe can be automatically controlled by simple means, ensuring easy operation.

In a broad sense, the invention is intended for detection of flaws in articles made, for instance, of metal, and is particularly suited for locating a flaw and determining its equivalent dimensions in specified profiles of articles, particularly in places located deeply in the article, with a probe mounted thereon.

An object of the present invention is to provide a simple means for automatically controlling the parameters of an ultrasonic pulse echo flaw-detector with a probe, and more particularly, for controlling the sweep delay time of an electron-ray indicator and an amplifier for the gain of signals, reflected from the flaw.

Another object of the present invention is to improve the performances of the ultrasonic pulse flaw-detector, namely in reducing the time required for controlling the above flaw-detector parameters, and also in raising the accuracy of the results.

Still another object of the present invention is to ensure easy handling of the probe, moved about the surface of the work in any direction.

Other objects and advantages of the invention will become obvious from the following detailed disclosure of the invention and the appended drawings wherein.

Figure 1:
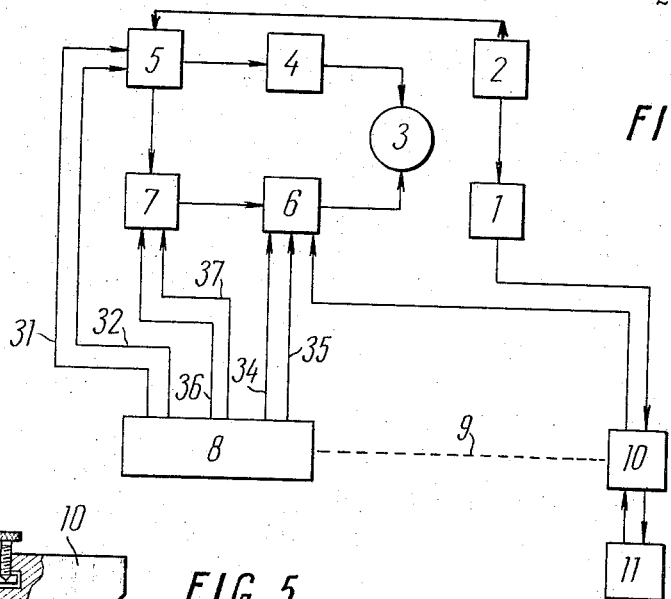
FIG. 1 is a block-diagram of the flaw-detector.

The invention (see FIG. 1) comprises a high-frequency oscillator 1; a synchronizer 2; a cathode-ray tube 3; a sweep generator 4 of the cathode-ray tube; a sweep delay block 5 of the cathode-ray tube; an amplifier 6 of signals reflected from the flaw; a functional converter 7 for controlling the gain of amplifier 6 during the reception of an ultrasonic signal, reflected from the area under test; a block 8 comprising displacement pickups, for instance, variable resistors, actuated by string 9 of a flexible element, said string being coupled with a movable probe 10.

Figure 2:
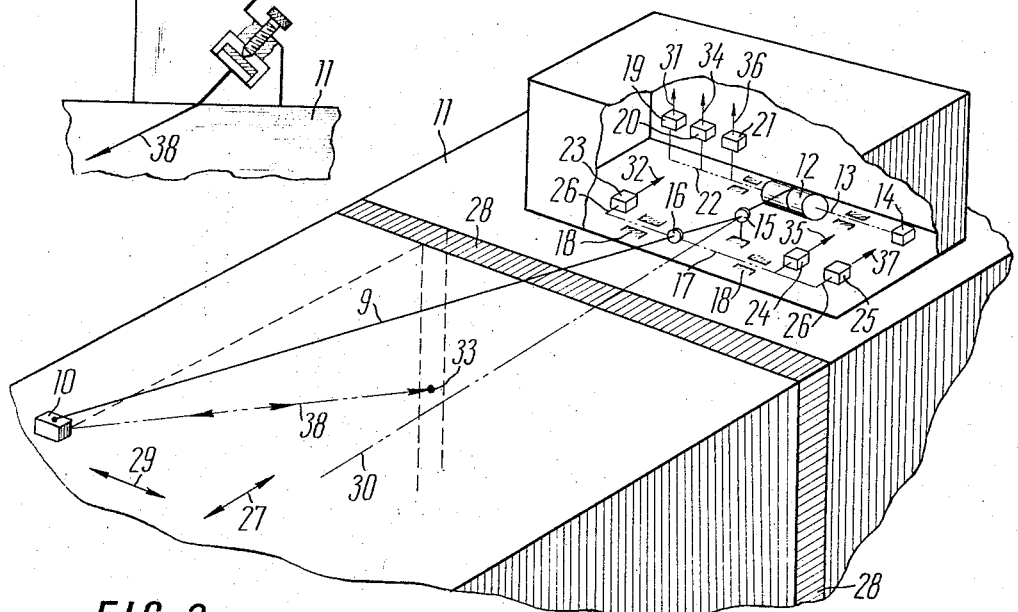
FIG. 2 illustrates the kinematic diagram of the flaw-detector control device, and the flaw-detector mounting on the work.
Figure 6:
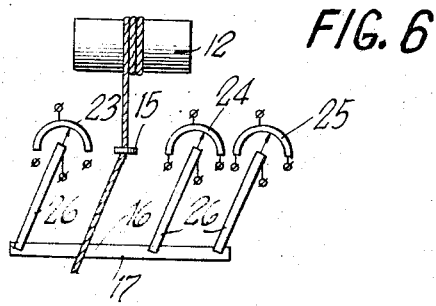
FIG. 6 shows exemplary mechanical couplings for transmitting variations of the string position to the axles of transverse displacement pickups.

Block 8 (see FIG. 2) is mounted stationary with respect to work 11 and comprises: cylinder 12 with axle 13 which is also stationary with respect to the work, the string 9 being wound on said cylinder; a drive device 14, for instance; an electric motor, for winding string 9; stationary support 15 and movable support 16 and movable support 16 in the form, for instance, of rings with string 9 running successively through the rings; rod 17, connected with movable support 16 and actuated to move along guides 18; displacement pickups 19, 20, 21, constituted, for instance, by variable resistors, actuated by cylinder 12 through mechanical couplings 22, and displacement pickups 23, 24, 25, represented, for instance, by variable resistors actuated through mechanical couplings 26 by rod 17, connected with movable support 16.

Displacement of probe 10, resolved into components as indicated by arrowheads 27 and 29, extending perpendicular to the plane of the specified work profile, for instance, weld seam 28, and parallel to said profile, is performed either manually, or by suitable automatic devices, not covered by this invention.

The turning angle of cylinder 12, and consequently the control operation of displacement pickups 19, 20, and 21, driven by cylinder 12, depend on the length of string 9, unwound from cylinder 12.

The displacement of rod 17, and consequently the control operation of displacement pickups 23, 24 and 25, driven by rod 17, are determined by the displacement of probe 10 parallel to the specified profile, as directed by arrowheads 29, respective of axis 30, running through stationary support 15 of string 9 and perpendicular to the plane of the specified profile.

The length of string 9, unwound from cylinder 12, and the displacement of probe 10 as indicated by arrowheads 29 relative to axis 30, produce a single value of the distance between probe 10 and the specified profile, for instance, weld seam 28, in the direction indicated by arrowheads 27.

Therefore, for obtaining the total control effect, depending on the distance between probe 10 and the specified profile, each of blocks 5, 6 and 7 is actuated by two of the displacement pickups, incorporated in block 8, one of said pickups being driven by cylinder 12 and the other by rod 17.

Displacement pickups 19 and 23 arranged inside block 8 (see FIGS. 1 and 2) control sweep delay block 5 along coupling lines 31 and 32 respectively. They also establish a sweep delay time of the electron-ray indicator, said time being equal to the reception time of an ultrasonic signal, reflected in the range between probe 10 and the area being tested, and as a result the sweep start coincides with the reception of ultrasonic oscillations, induced in the area under test, for instance, a weld. This permits to observe in the screen of indicator 3 only the area being tested, whatever the distance between probe 10 and the specified profile, to make a full use of the screen of indicator 3 in representing the area being tested at a maximum permissible scale in said indicator, and to facilitate visual observation of signals, located close to each other in the screen of indicator 3.

The signal magnitude in the screen of indicator 3 is defined exclusively by the equivalent dimensions of flaw 33 and the signal magnitude is compensated so that it does not depend on the distance between flaw 33 and probe 10.

Displacement pickups 20 and 24, accommodated within block 8 (see FIGS. 1 and 2) control amplifier 6 along coupling line 34 and 35 respectively, and displacement pickups 21 and 25 control functional converter 7 along coupling lines 36 and 37 respectively.

Figure 5:
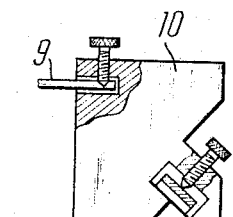
FIG. 5 is a side view partially broken away of the probe.

Displacement pickups 20 and 24 establish the initial gain of amplifier 6, said gain being constant throughout the reception time of ultrasonic beam 38, directed at an inclined angle towards the surface of work 11 (see FIG. 5) and reflected in the range between probe 10 and the specified area being tested, or in other words, during the time from the start of ultrasonic emission until the start of the beam sweep in indicator 3.

According to the dependence of the initial gain of amplifier 6 on the distance between probe 10 and the specified profile of the work, for compensating the attenuation of ultrasonic beam 38 (towards the area being tested), displacement pickups 20 and 24 may be made, for instance, as non-linear variable resistors.

Displacement pickups 21 and 25 prepare the parameters of a signal, by which functional converter 7 exercises the time control, under the necessary specified function, of the gain of amplifier 6 after a sweep start signal arrives at functional converter 7 from sweep delay block 5 during the reception of ultrasonic radiation, reflected from the area under test.

As a consequence of the above, the gain of amplifier 6 varies throughout the sweep time of the beam in indicator 3 under the specified function in the range required to compensate the attenuation of ultrasonic beam 38 within the area being tested, for instance, a weld seam. This fact permits to avoid difficult time control of the gain of amplifier 6 under the specified complicated function in the range required for compensating the attenuation of ultrasonic beam 38 in the entire area from probe 10 to flaw 33, and permits to compensate attenuation of ultrasonic beam 38 at a substantial distance between probe 10 and flaw 33 by means of simple arrangements, because the present invention does not require time compensation of attenuated ultrasonic beam 38 in the area between probe 10 and flaw 33.

In carrying out the inspection of works by means of the present flaw-detector, block 8 is mounted at a certain distance from the specified profile under test, and probe 10 is moved about work 11 and is positioned relative to the profile being tested, and therefore of block 8, so that ultrasonic beam 38 is directed against the specified area of the profile being tested. Intermittent ultrasonic emissions produce signals in the screen of indicator 3, the position and size of said signals being indicative of the location and equivalent dimensions of the flaw in the area being tested.

The present invention is distinguished in that string 9, wound on cylinder 12, whose axle 13 is stationary with respect to work 11, is mechanically coupled with inclined probe 10 and is employed to drive displacement pickups in the ultrasonic pulse echo flaw-detector.

The above permits to simplify the arrangement for automatically controlling flaw-detector parameters depending on the position of probe 10 relative to the profile being tested such as, for instance, weld seam 28, and to ensure easy handling of probe 10, moved about work 11 in any direction.

Another distinction of the disclosed flaw-detector is that it incorporates stationary support 15 and movable support 16, made, for instance, as rings, the string 9 running successively through the rings to probe 10 from cylinder 12, movable support 16 being connected with rod 17 which is movable along stationary guides 18.

The above design permits to measure the displacement of probe 10 parallel to the profile under test, for example, weld seam 28.

The flaw-detector described herein is also characterized by the arrangement in which it comprises displacement pickups, actuated by cylinder 12 with string 9 wound thereon and connected with probe 10; other displacement pickups being driven by rod 17, and being connected with movable support 16 with string 9 slung therethrough.

This feature permits to simplify the mechanical part of the arrangement for determining the position of probe 10 relative to the profile being tested.

Additionally, the described flaw-detector is distinguished in that it comprises functional converter 7, which controls the gain value of amplifier 6, amplifying signals reflected from the flaw over the reception time of ultrasonic oscillations reflected from the area being tested.

This characteristic feature permits by simple means to compensate the attenuation of ultrasonic beam 38 at a large distance between probe 10 and the area under test.

Figure 4:
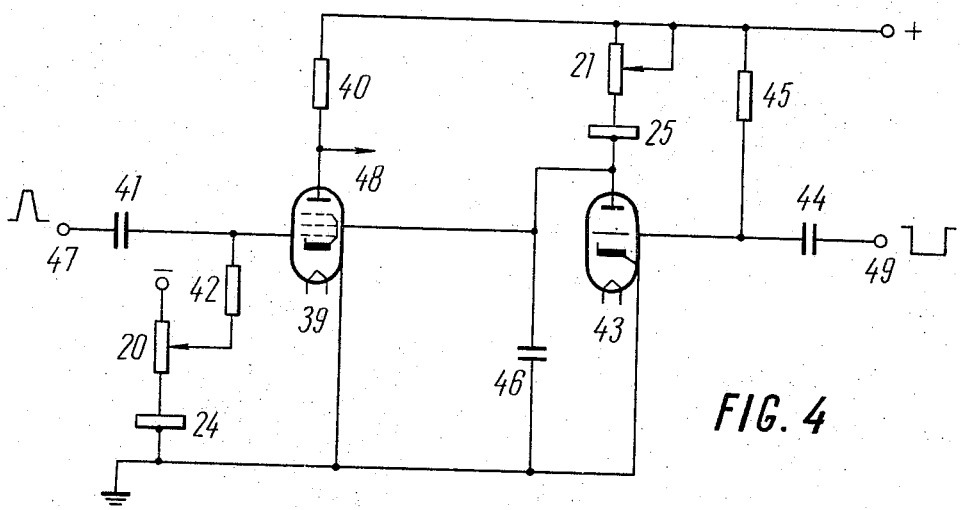
FIG. 4 is an example of an electronic circuit for controlling amplifier gain of signals, reflected from the flaw.

To make the invention more understandable to those skilled in the art, we hereinafter furnish an illustrative circuit of amplifier 6, amplifying signals reflected from the flaw, and functional converter 7, which controls amplifier 6 (see FIG. 4).

Amplifier 6, amplifying signals reflected from the flaw, consists of vacuum pentode 39 with a common cathode, anode resistor 40 and displacement pickups 20 and 24 (see FIGS. 2 and 4), made as variable resistors in the first-grid circuit of pentode 39.

Functional converter 7 (see FIG. 1) comprises vacuum triode 43 with a common cathode, capacitor 44 and resistor 45 in the grid circuit, capacitor 46 and displacement pickups 21 and 25 (FIGS. 2 and 4), made as variable resistors connected to the anode of triode 43.

Capacitor 46 sends a signal to the second grid of pentode 39.

Resistor 24 is connected to resistor 20, and resistor 25 is connected to resistor 21 in order to compensate for the action of resistors 20 and 21, which action depends on the length of string 9 unreeled from cylinder 12, as probe 10 moves parallel to the profile scanned (FIGURES 2 and 4) in the direction indicated by arrow 29.

When probe 10 is brought to the required position, by displacement pickups 20, 24, 21 and 25, resistances in the first-grid circuit of pentode 39 and in the anode circuit of triode 43 are adjusted in accordance with the distance between the probe and the required profile.

Sound signals, reflected from the flaw, arrive along the channel at input 47 and further on at the first grid of pentode 39 through capacitor 41. Output voltage is recorded at anode 48 of pentode 39.

During the reception of ultrasonic oscillations, reflected from the area between the sound and the specified profile, triode 43 is opened and the gain of pentode 39 is unvariable and is determined by the distance between the sound and the specified profile.

At the start of reception of ultrasonic oscillation, reflected from the area being tested, a sweep-start pulse, stopping triode 43, is issued by the sweep-delay block and arrives at input 49, and then through capacitor 44 at the grid of triode 43.

Capacitor 46 is charged through resistors 21 and 25, and as a result the gain of pentode 39 varies according to the specified function in the range ensuring compensation of the attenuated ultrasonic beam within the area under test.

Figure 3:
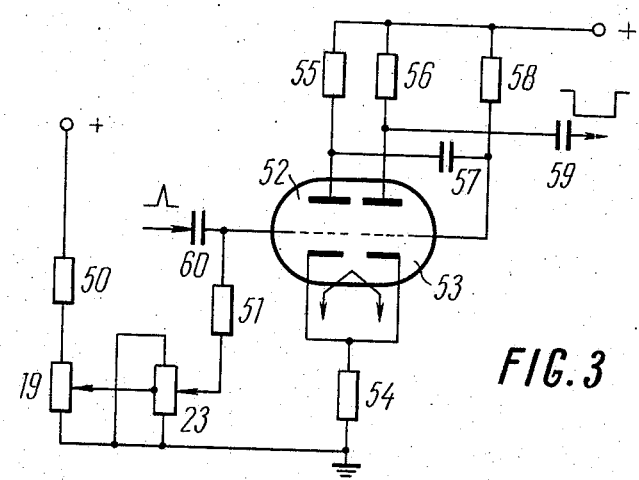
FIG. 3 shows an example of an electronic circuit for controlling the flaw-detector sweep delay.

We have also furnished an illustrative circuit of delay block 5 of the beam sweep generator in cathode ray tube 3 (see FIG. 3).

Sweep delay block 5, which is a release device with cathode connection, comprises vacuum triodes 52 and 53, resistors 50, 51, 54, 55, 56, 58, capacitors 57, 59, 60 and displacement pickups 19 and 23, made as variable resistors arranged in the grid circuit of triode 52.

From synchronizer 2, via capacitor 60, a signal arrives at the grid of triode 52; operated by this signal, the sweep delay block generates a pulse, the duration of which depends on the resistance of displacement pickups 19 and 23. At termination of the pulse, sweep generator 4 is cut in through capacitor 50.

When probe 10 is brought to the desired position, displacement pickups 19 and 23 establish resistance values, depending on the distance between the probe and the required profile.

The present invention can be employed for inspecting materials, such as metals, by successive examination of parallel profiles; for inspecting joints, for instance, weld joints, with variable positions of such profiles in the work, particularly when the probe has to be arranged at a large distance from the area being tested.

It is noteworthy, that the present invention permits to simplify investigation procedures, to increase the inspection efficiency to record the results by providing the echo flaw-detector with an adequate recording means additionally, the accuracy of the results obtained can be increased, for instance, due to the fact that the magnitude of a signal reflected from the flaw is defined in the indicator screen by the flaw equivalent dimensions alone.

We claim:

1. An ultrasonic pulse echo flaw-detector comprising an ultrasonic probe with angled transducer adapted for scanning a particular region and for receiving reflected signals therefrom by undergoing movement relative to said region in longitudinal and transverse directions, a cylinder mounted for rotation about a fixed transverse axis, a flexible element wound on said cylinder and connected with said probe, longitudinal displacement pickups responding to the angular position of the cylinder for establishing the length of the flexible element unwound from the cylinder, transverse displacement pickups responding to transverse displacement of the flexible element at a given distance from a fixed location on a predetermined longitudinal axis, a stationary support on said longitudinal axis through which the flexible element slidably passes, a transversely movable support spaced from said stationary support and said cylinder, said flexible element slidably passing through said movable support to transversely displace the same as said probe in transversely displaced, and means coupled to said transducer for receiving the reflected signals therefrom and for producing a signal having a magnitude indicative of the size of a flaw in said region, said longitudinal and transverse displacement pickups being coupled to the latter means for controlling the output signal produced thereby in relation to the longitudinal and transverse positions of the probe to maintain an identical relation between the magnitude of said signal and the size of the flaw over the entire region being scanned for all positions of the probe.

2. A detector as claimed in claim 1 wherein said pickups are variable resistors.

3. A detector as claimed in claim 1 wherein said supports are rings, the detector further comprising a rod coupled to the movable support for operating said transverse displacement pickups.

4. An ultrasonic pulse echo flaw-detector, comprising a high-frequency generator for exciting short probing electric pulses; a movable probe with an ultrasonic transducer connected to said generator and disposed on the surface of the object to irradiate the same with an angled ultrasonic beam, which traverses a controlled area inside the object and is reflected from a flaw back to the transducer; a signal amplifier at the output of said transducer; an oscilloscope with a cathode-ray tube connected to the output of said amplifier for visually displaying the output signals of said amplifier; means for delaying the start of the sweep of said oscilloscope with respect to the appearance of the probing pulse of said generator; a rotary cylinder with a flexible element wound thereon, one end of said flexible element being attached to the cylinder and the other fixed to said probe, said cylinder being disposed in fixed position relative to the object; displacement pickups connected with said cylinder and said flexible element to measure the probe displacement with respect to the controlled area of the object and generate signals corresponding to said displacement, said pickups being connected to said signal amplifier and said sweep delay means to enable its signals to control the gain factor of the amplifier and the magnitude of sweep delay of the oscilloscope depending on the distance between the probe and the controlled area of the object for maintaining an identical relation between the magnitude of the signal measured at the oscilloscope output and the size of the flaw across the entire controlled area.

5. A flaw-detector as claimed in claim 4 comprising a fixed support and a movable support slidable with respect to the fixed support in a direction parallel to the axis of rotation of the cylinder, said flexible element passing through said supports to cause the movable support to undergo slidable displacement as the probe moves with a component parallel to the cylinder; said displacement pickups being constituted by variable electric resistors, some of which are operatively conected with the cylinder and others with said fixed support so that the sum of pickup signals defines the displacement of the free end of the flexible element and of said probe with relation to the controlled area.

References Cited

UNITED STATES PATENTS

| | | | |
|---|---|---|---|
| 3,023,611 | 3/1962 | Howry | 73—67.8 |
| 3,033,029 | 5/1962 | Weighart | 73—67.8 |
| 3,086,390 | 4/1963 | Brown | 73—67.8 |
| 3,178,933 | 4/1965 | Block et al. | 73—67.8 |

JAMES J. GILL, Acting Primary Examiner.

RICHARD C. QUEISSER, JOHN P. BEAUCHAMP,
*Examiners.*